(12) United States Patent
Hyde et al.

(10) Patent No.: US 8,258,951 B2
(45) Date of Patent: Sep. 4, 2012

(54) METHOD AND SYSTEM FOR CORRELATING EXTERNAL DATA TO A PLANT WITH AN ELECTRONIC TAG

(75) Inventors: Roderick A Hyde, Redmond, WA (US); Muriel Y. Ishikawa, Livermore, CA (US); Jordin T. Kare, Seattle, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1045 days.

(21) Appl. No.: 12/215,674

(22) Filed: Jun. 27, 2008

(65) Prior Publication Data

US 2009/0231110 A1    Sep. 17, 2009

Related U.S. Application Data

(63) Continuation-in-part of application No. 12/077,066, filed on Mar. 14, 2008.

(51) Int. Cl.
*G08B 13/14* (2006.01)

(52) U.S. Cl. .................. 340/572.1; 340/10.1; 47/1.7

(58) Field of Classification Search .... 340/572.1–572.8, 340/10.1, 10.4; 47/1.7
See application file for complete search history.

(56) References Cited

U.S. PATENT DOCUMENTS

| | | | |
|---|---|---|---|
| 4,379,372 A | 4/1983 | Alexander et al. | |
| 4,570,368 A | 2/1986 | Stover | |
| 4,972,616 A | 11/1990 | Doll | |
| 5,339,517 A | 8/1994 | Diemer | |
| 6,597,465 B1 | 7/2003 | Jarchow et al. | |
| 6,671,698 B2 | 12/2003 | Pickett et al. | |
| 6,701,665 B1 | 3/2004 | Ton et al. | |
| 6,745,127 B2 * | 6/2004 | Crosby | 702/2 |
| 6,888,458 B2 * | 5/2005 | Carlson | 340/540 |
| 6,963,881 B2 | 11/2005 | Pickett et al. | |
| 7,076,900 B2 | 7/2006 | Faulkner | |
| 7,080,577 B2 | 7/2006 | Latschbacher et al. | |
| 7,143,066 B2 | 11/2006 | Shear et al. | |
| 7,200,804 B1 | 4/2007 | Khavari et al. | |
| 7,233,250 B2 | 6/2007 | Forster | |

(Continued)

FOREIGN PATENT DOCUMENTS

JP    2006101739 A    4/2006

(Continued)

OTHER PUBLICATIONS

Data Identifier and Application Identifier Standard, American National Standard, Material Handling Industry (Oct. 9, 2006), pp. 1-110.

(Continued)

*Primary Examiner* — Eric M Blount
(74) *Attorney, Agent, or Firm* — Workman Nydegger

(57) ABSTRACT

One or more plants may be associated with an electronic tag including a memory circuit and interrogation interface. The memory circuit in the electronic tag may include data corresponding to the one or more plants. According to an embodiment the data may include at least one data coordinate corresponding to an external database holding data related to the one or more plants. The external database may hold plant care information such as a record of treatments received by the one or more plants and/or plant care instructions, for example. The data may be structured.

104 Claims, 7 Drawing Sheets

U.S. PATENT DOCUMENTS

| | | | |
|---|---|---|---|
| 7,316,202 B2 | 1/2008 | Fantin et al. | |
| 7,403,855 B2 * | 7/2008 | Fuessley et al. | 702/5 |
| 7,702,462 B2 * | 4/2010 | Fuessley et al. | 702/2 |
| 7,761,334 B2 | 7/2010 | Pickett et al. | |
| 7,798,746 B2 | 9/2010 | Byles | |
| 2001/0029996 A1 * | 10/2001 | Robinson | 141/11 |
| 2002/0170229 A1 | 11/2002 | Ton et al. | |
| 2003/0066234 A1 | 4/2003 | Bussey, Jr. | |
| 2003/0218060 A1 * | 11/2003 | Carlson | 235/376 |
| 2004/0088330 A1 | 5/2004 | Pickett et al. | |
| 2004/0088916 A1 | 5/2004 | Ton et al. | |
| 2005/0134461 A1 | 6/2005 | Gelbman et al. | |
| 2006/0022824 A1 | 2/2006 | Olsen, III et al. | |
| 2006/0080819 A1 | 4/2006 | McAllister | |
| 2006/0085266 A1 | 4/2006 | Wei et al. | |
| 2006/0116791 A1 | 6/2006 | Ravula et al. | |
| 2006/0220955 A1 | 10/2006 | Hamilton | |
| 2007/0044445 A1 | 3/2007 | Spicer et al. | |
| 2007/0079536 A1 | 4/2007 | Hall | |
| 2007/0152045 A1 | 7/2007 | Erickson et al. | |
| 2007/0185749 A1 | 8/2007 | Anderson et al. | |
| 2007/0222596 A1 | 9/2007 | Kleijn et al. | |
| 2007/0285229 A1 | 12/2007 | Batra et al. | |
| 2008/0074254 A1 | 3/2008 | Townsend et al. | |
| 2008/0129497 A1 | 6/2008 | Woodard et al. | |
| 2008/0220721 A1 | 9/2008 | Downie et al. | |
| 2008/0243392 A1 * | 10/2008 | Fuessley et al. | 702/2 |
| 2008/0297350 A1 | 12/2008 | Iwasa et al. | |
| 2009/0042180 A1 * | 2/2009 | Lafferty et al. | 435/4 |
| 2009/0070037 A1 | 3/2009 | Templeton et al. | |
| 2009/0108997 A1 | 4/2009 | Petterson et al. | |
| 2009/0128336 A1 | 5/2009 | Huang et al. | |
| 2009/0319400 A1 | 12/2009 | Pratt | |
| 2010/0283584 A1 | 11/2010 | McAllister | |

FOREIGN PATENT DOCUMENTS

| | | |
|---|---|---|
| WO | WO 2004/023377 A1 | 3/2004 |
| WO | WO 2007/042327 A1 | 4/2007 |

OTHER PUBLICATIONS

Hyde et al.; U.S. Appl. No. 12/077,066, filed Mar. 14, 2008.

* cited by examiner

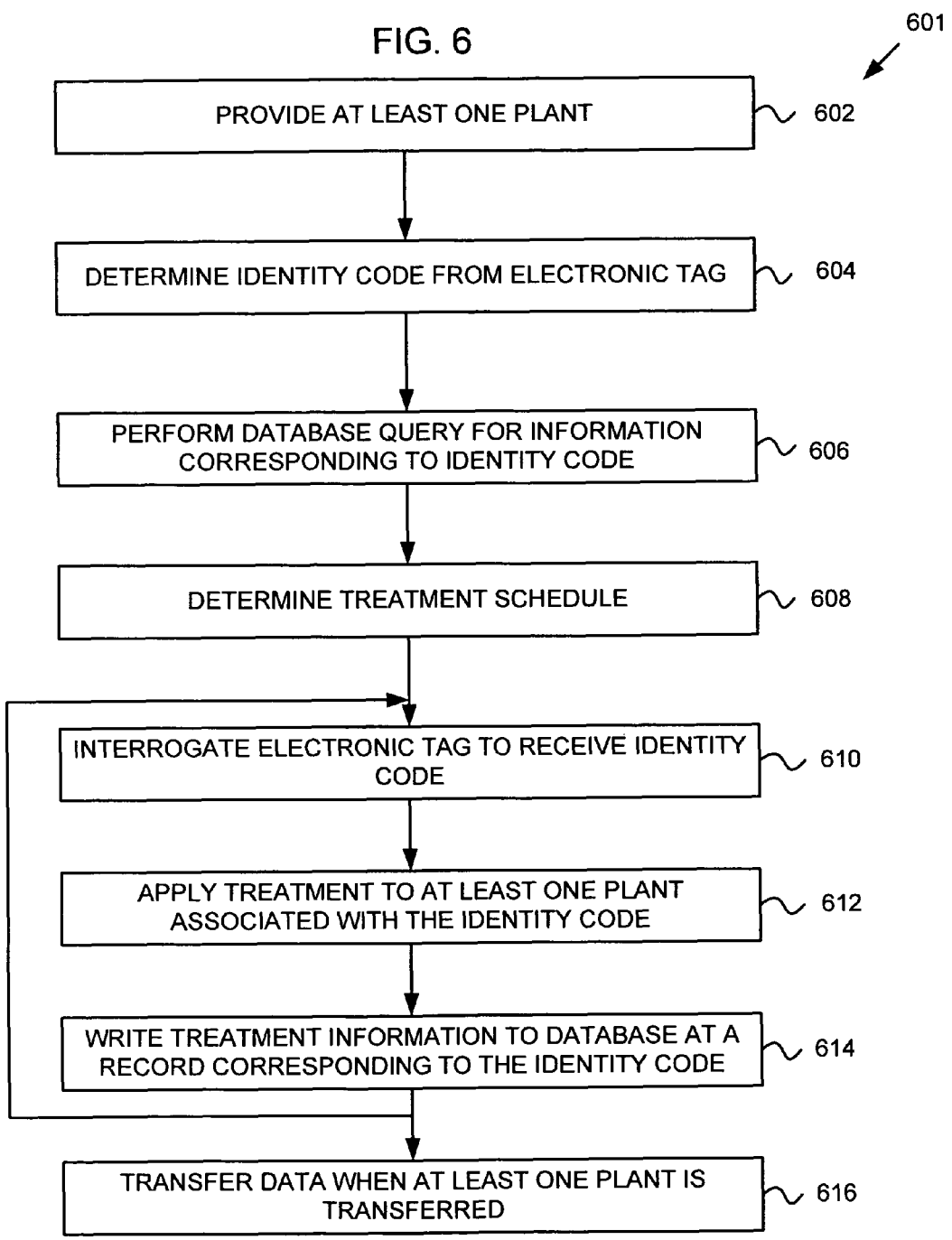

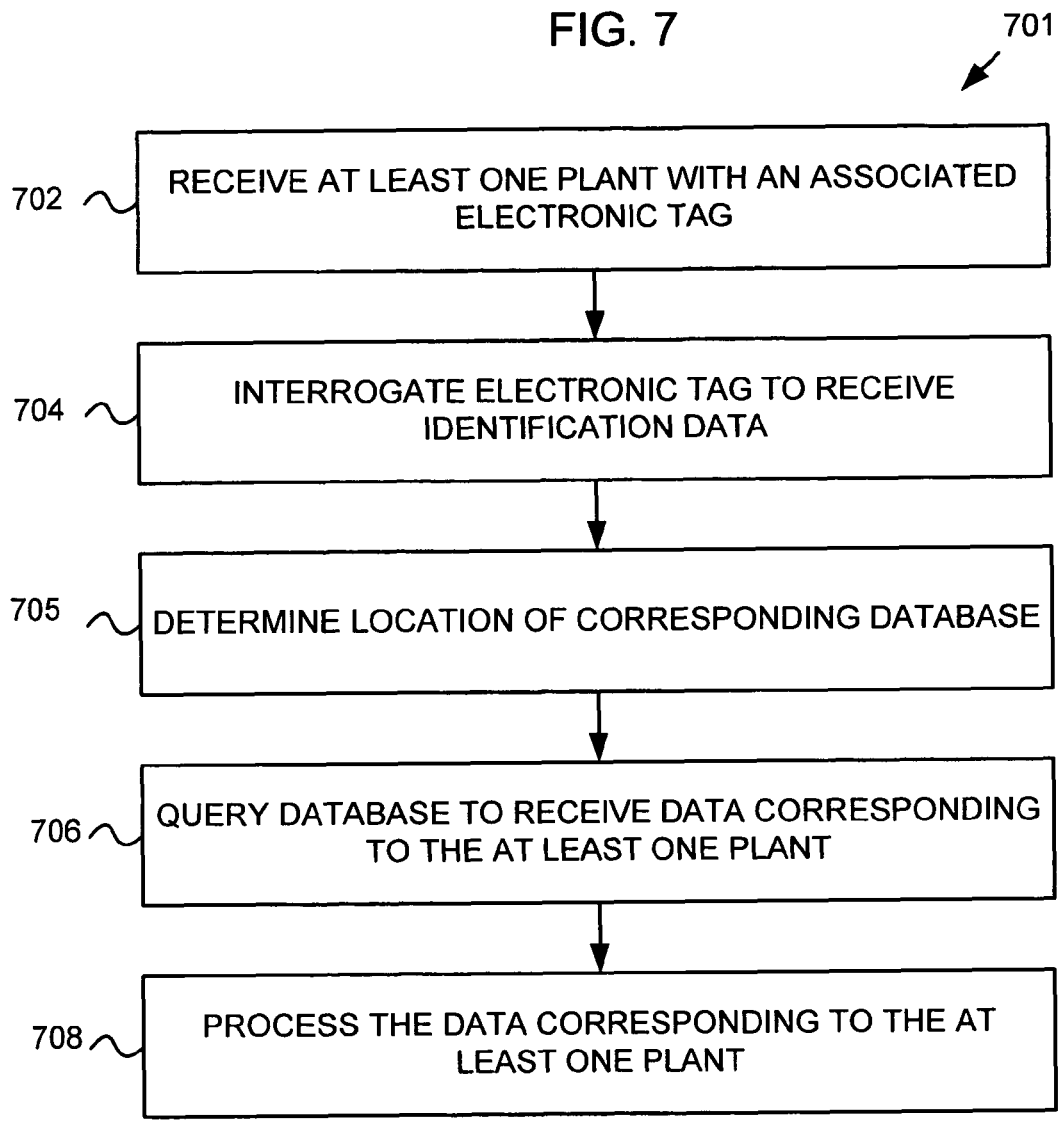

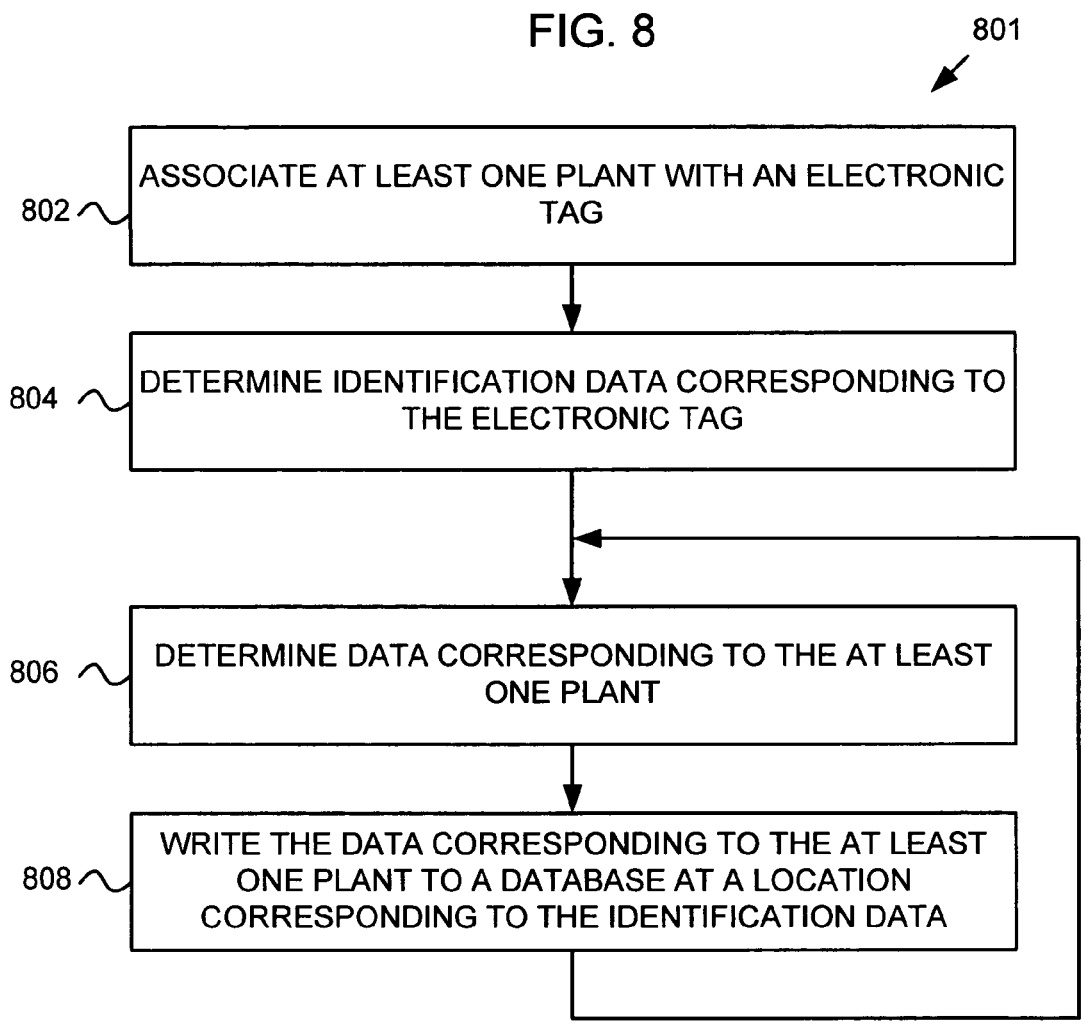

METHOD AND SYSTEM FOR CORRELATING EXTERNAL DATA TO A PLANT WITH AN ELECTRONIC TAG

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 12/077,066, entitled METHOD AND APPARATUS FOR TRACKING PLANTS WITH AN ELECTRONIC TAG, naming Roderick A. Hyde, Muriel Y. Ishikawa, Jordin T. Kare, and Lowell L. Wood, Jr. as inventors, filed Mar. 14, 2008, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

SUMMARY

According to one aspect, an electronic tag may include a memory and an interrogation interface; and the memory may include identification data corresponding to one or more associated plants. The identification data may correspond to information in an external database corresponding to the one or more associated plants. The information may include plant care information such as plant care instructions and/or plant treatment history.

In one aspect, a method includes but is not limited to receiving at least one plant with an associated electronic tag, the electronic tag carrying identification data corresponding to the at least one plant, and interrogating the electronic tag to receive the identification data; and querying an external database to receive information corresponding to the identification data and the at least one plant. The information may include plant care information such as plant care instructions and/or plant treatment history.

In another aspect, a method includes but is not limited to providing an electronic tag carrying identification data and physically associating the electronic tag with the at least one plant; and recording in an external database information corresponding to the at least one plant.

In another aspect, a method includes but is not limited to receiving identification data from an electronic tag associated with at least one plant, and determining a database having information corresponding to the identification and the at least one plant. In another aspect, a method includes querying the database determined to have the information to retrieve the information. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to an electronic tag interrogator to interrogate an electronic tag including a memory circuit and an interrogation interface; and the memory may include identification data corresponding to information about one or more associated plants. The system may include one or more remote resources for storing data corresponding to identification data read from and/or written to the electronic tag. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not in any way limiting. Other aspects, features and advantages of the devices and/or processes and/or other subject matter described herein will become apparent in the teachings set forth herein.

BRIEF DESCRIPTION OF THE FIGURES

FIG. 6 is a flow chart illustrating one or more processes for correlating external data to at least one plant using an electronic tag, according to an embodiment FIG. 7 is a flow chart illustrating one or more processes for receiving at least one plant with an electronic tag, and querying a corresponding record in a database to receive information corresponding to the at least one plant, according to an embodiment.

FIG. 8 is a flow chart illustrating one or more processes for associating an electronic tag with at least one plant and writing to a database information pertaining to the at least one plant, according to an embodiment.

The use of the same symbols in different drawings typically indicates similar or identical items.

DETAILED DESCRIPTION

Figure 1:
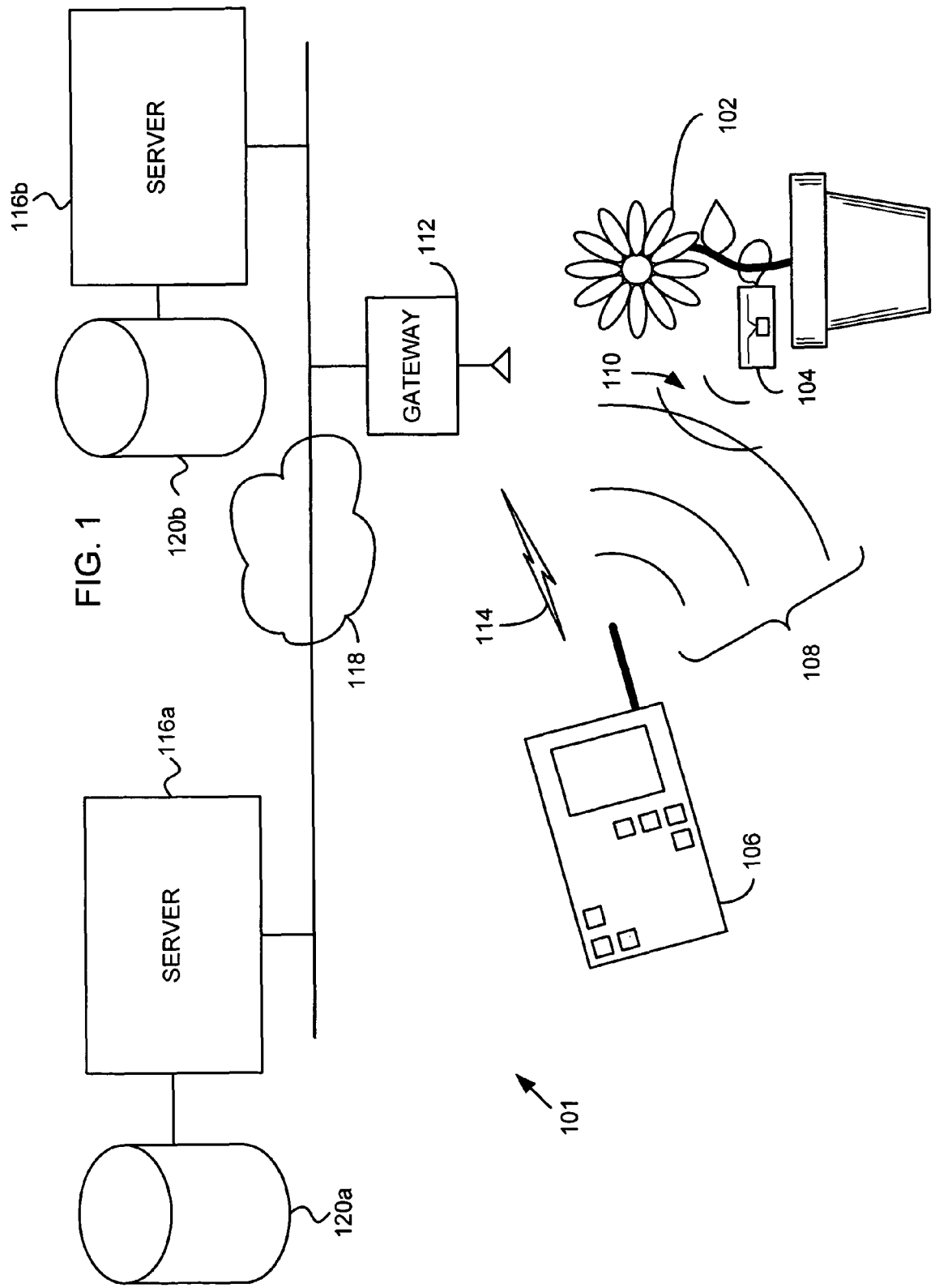
FIG. 1 is an illustrative diagram of a system and apparatuses for correlating external data to one or more plants with an electronic tag, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is an illustrative diagram of a system 101 for correlating external data related to one or more plants 102 with an electronic tag 104, according to an embodiment. An electronic tag interrogator 106 may interrogate the electronic tag 104 to receive identification data corresponding to the at least one plant 102. For example, the electronic tag interrogator 106 may include a radio frequency identification (RFID) interrogator that is configured to emit an interrogation field 108 including a radio frequency signal to illuminate one or more radio frequency tags (RF tags) 104. The interrogation field or interrogation signal 108 may be modulated with an appropriate pattern for evoking a response 110 from the RF tag 104. According to some embodiments, the electronic tag interrogator may be in the form of a hand-held and/or portable apparatus that may optionally be in communication with a remote device 112 via a communication signal 114. For example, the remote device 112 may include a gateway, host computer, etc. configured to communicate with the electronic tag interrogator 106 via a radio communication signal 114.

According to an embodiment, the remote device 112 may be operatively coupled to a second remote device 116a, such as a server, over a network 118. The second remote device 116a may include a storage apparatus 120a configured to store at least a portion of a database including information corresponding to the identification data from the electronic tag 104 and the associated at least one plant 102. The remote device 112 may be operatively coupled to a third remote device 116b such as a server, over the network 118. The third remote device 116b may also include a storage apparatus 120b configured to store at least a portion of a database including information corresponding to the identification data from the electronic tag 104 and the associated at least one plant 102.

A computer program (not shown) may reside on the electronic tag interrogator 106, the remote device 112, the second remote device 116a, and/or the third remote device 116b, the computer program being operative to interact with data relayed from the electronic tag 104. For example, a computer program may be operative to receive data from the electronic tag, determine a location (such as an IP address or URL) where or most likely where a database includes information corresponding to the identification data. Optionally, the computer program may automatically route a query to a location 116a, 116b for accessing the most likely database and return information corresponding to the at least one plant 102. For example, the query may return information such as plant care instructions or plant treatment history corresponding to the identification data.

The electronic tag 104 may, for example, include various types of electronic tags including a radio frequency tag, such as a passive radio frequency tag, an active radio frequency tag, a backscatter radio frequency tag, a half-duplex radio frequency tag, or a full-duplex radio frequency tag, for example; a touch memory device; a proximity card; a smart card; a photonic tag; etc. Accordingly, the interrogation signal 108 and response signal 110 may include corresponding forms such as radio frequency interrogation and response, touch memory interrogation and response, proximity card interrogation and response, smart card interrogation and response, etc.

Additionally, electronic tags may include read-only, read/write, and write-once-read-many-times (WORM) capabilities. In the case of a writable tag technology such as a read/write or WORM, the relationship shown diagrammatically in FIG. 1 may include writing data from the interrogator 106 to the electronic tag 104 via the interrogation signal 108 and response 110. According to an embodiment, the interrogator 106 may write to the electronic tag 104 identification data and/or one or more external data coordinates and/or other data associated with accessing external data related to the at least one plant 102.

While the at least one plant 102 is illustrated as a single plant in a pot, other forms are contemplated such as flats, rows, pallets, bare root, root ball, groupings, arrangements, beddings, gardens, etc.

Figure 2:
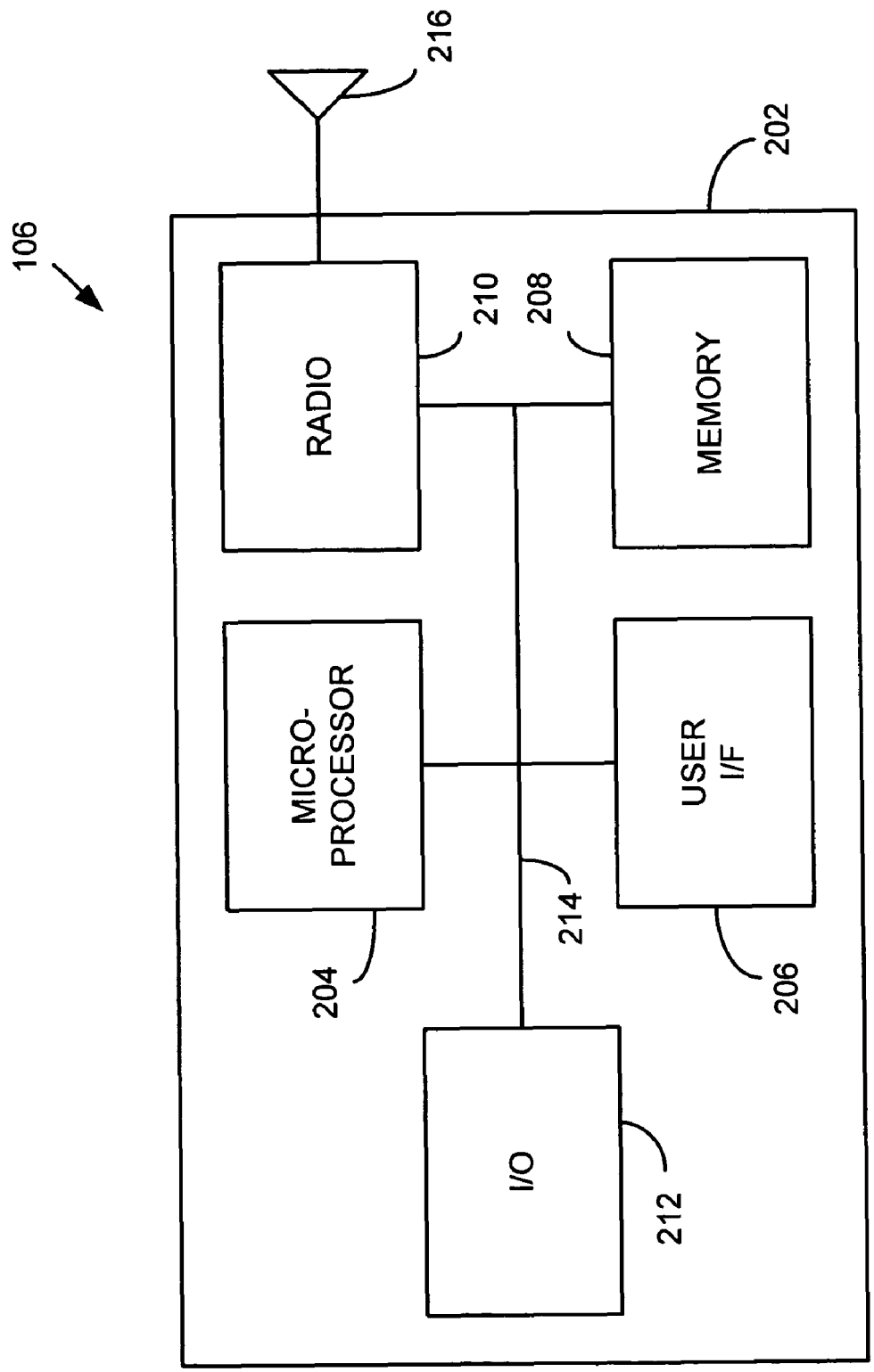
FIG. 2 is a block diagram of an illustrative electronic tag interrogator as depicted in FIG. 1, according to an embodiment.

FIG. 2 is a block diagram of an illustrative electronic tag interrogator 106 as depicted in FIG. 1, according to an embodiment. The electronic tag interrogator 106 may be embodied, for example, as an RF tag interrogator. The interrogator 106 may include a housing 202 substantially enclosing a microprocessor 204, user interface 206, memory circuitry 208, a radio configured to interrogate one or more types of RF tags, and an interface 212 operatively connected by one or more data buses 214. The radio 210 may include one or more antennas 216 operable to illuminate one or more RF tags with an interrogation field and receive a response signal from the one or more RF tags. The interface 212 may itself include a radio configured for communication with a host computer or computer network.

The interrogator 106 may be operable to run a computer program such as a data parsing program configured to parse identification data pertaining to one or more plants from one or more RF tags, and determine one or more external data coordinates corresponding to a database holding information corresponding to the identification data. Additionally or alternatively, the interrogator 106 may be operable to transmit received data over the interface 212 to a remote processing resource 112, 116a, 116b and receive information corresponding to the at least one plant (not shown) from the remote processing resource.

According to an illustrative embodiment, the RF tag interrogator 106 may receive a command such as a trigger pull through the user interface 206, interrogate an RF tag associated with at least one plant (not shown) with the radio 210 and at least one antenna 216 to receive data corresponding to the identification of at the least one plant, temporarily write received data to workspace in the memory circuitry 208, and execute a program from memory circuitry 208 with the microprocessor 204 to determine a location of an external resource for performing a query of or writing data to an external database.

Referring back to FIG. 1, two or more external resources or servers 120a, 120b may provide databases for storing data corresponding to the care of at least one plant, wherein the at least one plant has associated therewith an electronic identification tag carrying plant identification data. The two or more external resources 120a, 120b may each include a portion of information related to the at least one plant. Alternatively, the two or more external resources 120a, 120b may represent a plurality of potential resources for storing or retrieving data related to the at least one plant.

Each external resource 120a, 120b that includes data disposed therein related to at least one plant includes the identification data also disposed on the database for identifying a portion of the database corresponding to the at least one plant.

The RF tag interrogator 106 may include a computer program configured to store additional data corresponding to a record of additional treatments provided to the at least one plant upon such treatment application. The RF tag interrogator 106 may include a computer program configured to retrieve from the database at least a portion of the data corresponding to the care of the at least one plant and determine whether a treatment is scheduled to be provided to the at least one plant. The RF tag interrogator 106 may provide an indication to administer the treatment to the at least one plant if the treatment is scheduled. Upon receiving acknowledgement of the treatment being provided, the RF tag interrogator 106 may then store in the database data corresponding to a record of providing the treatment.

The RF tag interrogator 106 may further store location data in an industry accessible registry, the location data corresponding to an address for accessing the database. For example, server 120a may be a resource that provides the database for storing treatment information for plants, and server 120b may be a resource that provides a database for storing one or more locations of server(s) 120a, where multiple instances of servers 120a are accessible for query and/or writing.

Referring to FIG. 1, a software program running on server 120a may associate in a database 116a data corresponding to the care of at least one plant 102 with data identifying the at least one plant 102. The data identifying the at least one plant 102 may be retained in an electronic identification tag 104 associated with each at least one plant 102. The data corresponding to the care of the at least one plant 102 may include plant care instructions or a record of at least one plant care treatment provided to the at least one plant 102.

For embodiments where the electronic tag 104 is writable, the electronic tag interrogator 106 may write to the electronic identification tag 104 a location corresponding to the database 116a where related data is disposed. Additionally or alternatively, the external resource 120a, the electronic tag interrogator 106, or another computing resource may transmit to a second resource 120b at least a portion of the data identifying the at least one plant and data corresponding to the location of the first database 116b for storage on the second database 116b. The data corresponding to the location of the first database 116a may be an accessible address such as an IP address or a URL from which the data corresponding to the care of the at least one plant may be retrieved.

Other embodiments may include additional or reduced functionality in the interrogator 106, may rely on increased or reduced functionality in an external resource, may be operated by a user or operate automatically, may be interfaced to a treatment device to detect treatments, and/or may rely on alternative interrogation technologies. The interface 212 may include a wired interface and/or an intermittent interface such as a memory stick, USB drive, or other detachable memory.

Figure 3:
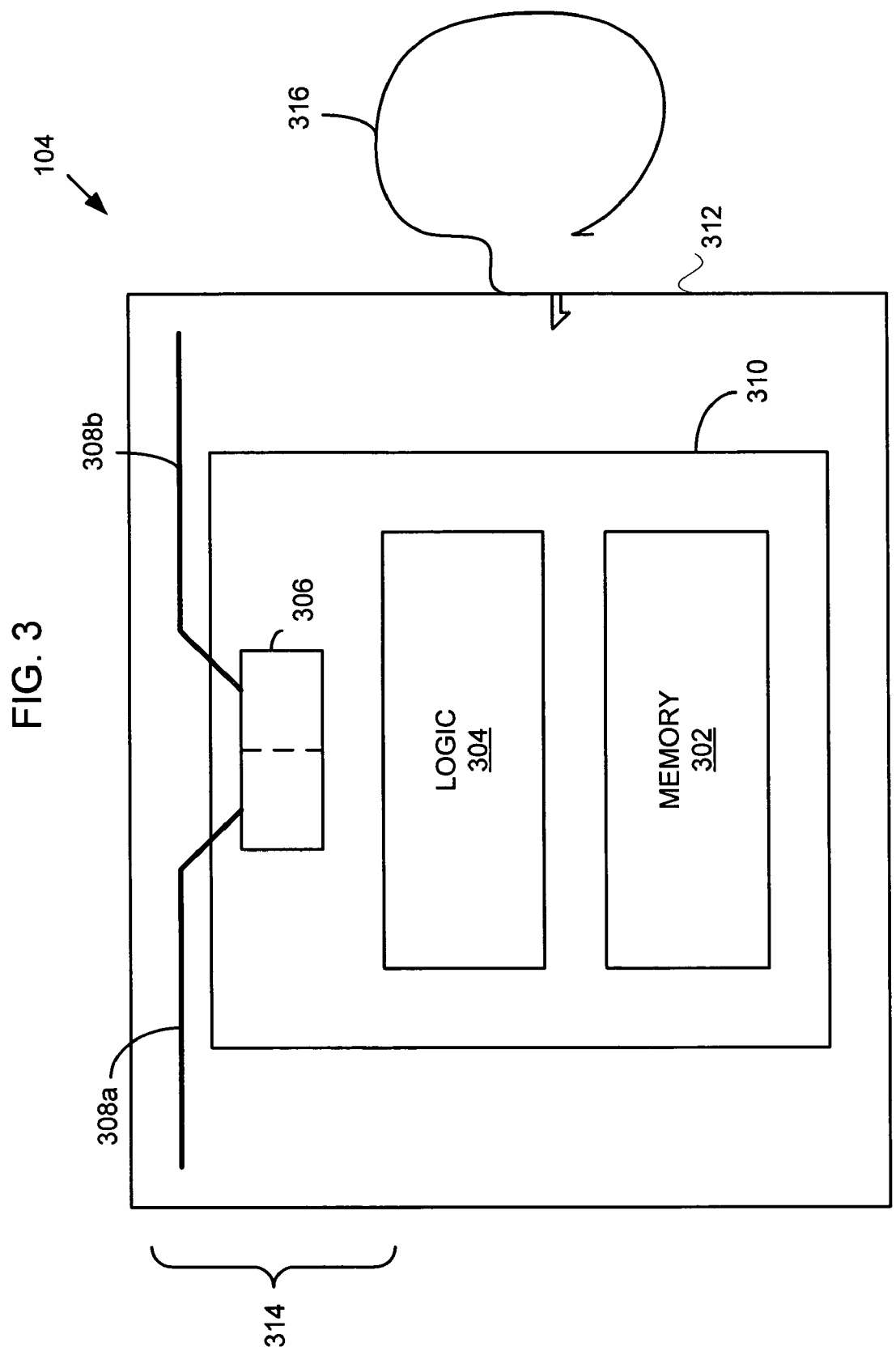
FIG. 3 is a block diagram of an illustrative electronic tag as depicted in FIG. 1, according to an embodiment.

FIG. 3 is a block diagram of an illustrative electronic tag 104 as depicted in FIG. 1, according to an embodiment wherein the electronic tag is in the form of a passive RF tag. The RF tag 104 includes a memory circuit 302 (which may be read/write, WORM, or read-only, for example) and a logic circuit 304 operatively coupled to the memory circuit 302. A radio frequency transceiver 306 is operatively coupled to the logic circuit 304. The radio frequency transceiver may be further coupled to an antenna 308a, 308b which may include two respective antenna segments 308a and 308b. The radio frequency transceiver 306 may be configured to provide a switched connection between the antenna segments 308a and 308b. According to an embodiment, the memory circuit 302, logic circuit 304, and transceiver 306 may be formed on a die 310 as an integrated circuit. The integrated circuit 310 and the antenna 308a, 308b may be disposed in a package 312 that may include a printed circuit, for example.

According to an embodiment, the package 312 may include encapsulation or other form of protection for the circuitry and/or antenna. The package 312 may include a coupling 316 adapted to attachment to a plant (not shown). In the example of FIGS. 1 and 3, the coupling 316 may include a loop such as a "zip tie" that provides a permanent or semi-permanent association with a plant or a group of plants. According to an embodiment, the coupling 316 may be formed integrally with the package 312 for convenient attachment to one or more plants.

The antenna 308a, 308b, transceiver 306, and optionally at least a portion of the logic circuit 304 may provide an interrogation interface 314 configured to communicate with an external interrogator (not shown). According to an embodiment, the transceiver 306 may hold the antenna portions 308a and 308b in substantial continuity during a first portion of a communication session. During the first portion of the communication session, an interrogation signal (not shown) in the form of radio frequency illumination may be received by the antenna 308a, 308b. In the case of a passive electronic tag 104, the radio frequency illumination may provide an AC voltage that is rectified by a portion of the transceiver 306 and used to charge one or more capacitors (not shown) that in turn provide DC power rails to operate the transceiver 306, logic 304, and memory 302. When the interrogation signal is received, the capacitor(s) charge and the transceiver 306, logic 304, and optionally the memory 302 may be powered up. According to some embodiments, it may be advantageous to power up only portions of the electronic tag 104 as the portions are needed.

Various messages may be encoded on the interrogation field. For example, one message may request tag ID, such as a segment of data by which the unique identity of the electronic tag 104 may be identified. Another message may specify a tag ID and request a portion or more of data held in the memory 302 of the particular electronic tag associated with the tag ID. According to one embodiment, the electronic tag 104 may respond to a data request in half-duplex as a backscatter signal.

For example, the electronic tag 104 may receive a request for at least a portion of data from the memory 302 over a modulated interrogation field (not shown) during a first portion of the communication session. The interrogator (not shown) may then cease to modulate the interrogation signal but maintain illumination of the signal onto the antenna 308a, 308b. The logic circuit 304 (powered by the illumination provided by the interrogation signal) then fetches the requested portion of data from the memory 302 and outputs the data to the transceiver 306. The transceiver 306 selectively couples and uncouples the portions of the antenna 308a, 308b in a pattern corresponding to the data received from the logic 304. The selective coupling and uncoupling of the antenna portions 308a, 308b creates a corresponding variation in reflectivity to the radio frequency illumination provided by the antenna. The variation in reflection may then be detected by the interrogator (not shown) and converted into data corresponding to the data fetched from memory 302.

Of course, substantial handshaking, error correction, and other interactions between the interrogation signal (not shown) and the response signal (not shown) may be used to improve communication reliability, extend range, and/or provide other capabilities.

Similarly, data may be written from an interrogator (not shown) to the memory 302 of an electronic tag 104 using a similar approach. Data that may be written to and/or read from the memory 302 an electronic tag 104 may include a range of contents. For example, the data may include an identifier corresponding to the at least one plant and/or one or more data coordinates referencing external data locations corresponding to the at least one plant.

Figure 4:
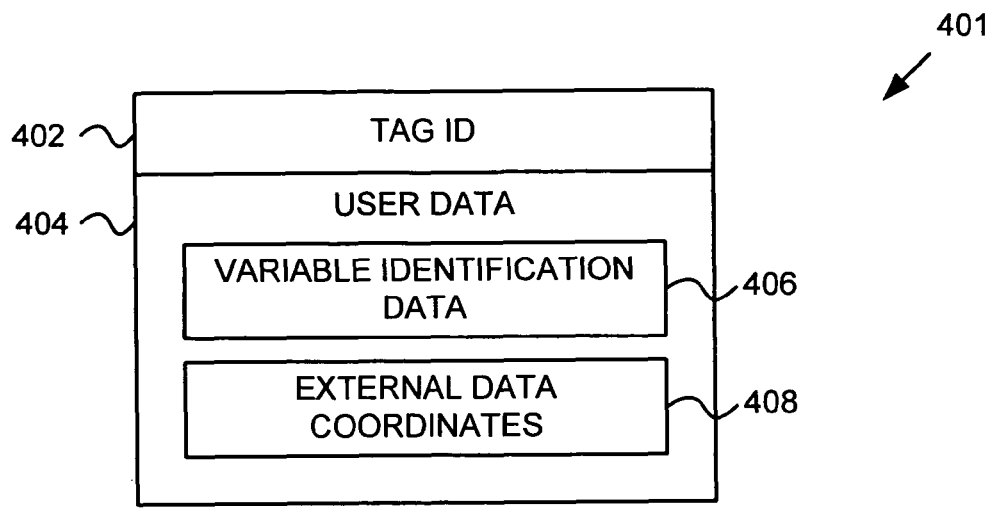
FIG. 4 is a diagram of memory contents of an electronic tag according to an embodiment.

Referring to FIG. 4, a memory diagram 401 shows two sections of data 402, 404 held within an electronic tag memory circuit, according to an embodiment. A first section of data (which may generally not be user-modifiable) is a tag identification 402. The tag identification may be encoded in a physically discontinuous portion of memory or may alternatively be encoded in a protected block of memory. According to some embodiments, the tag identity 402 may be recorded at the time of tag manufacture. For read-only tags or WORM tags, the tag ID 402 may be substantially the only memory within the electronic tag.

A second (optional) section of memory 404 includes user-modifiable data. A user-written identification 406 may include a binary, octal, hexadecimal, nibble-based, byte-based, word-encoded, ASCII, etc. identification data for identifying correspondence to one or more plants. The correspondence may be provided according to a variety of logical formats such as serialized, random, pseudo-random, deterministic, interrupt level, symbolic, human-readable, or other selected logical construct providing an identity corresponding to one or more plants.

In the example of FIG. 4, identification data (e.g., the Tag identification 402 or the variable identification data 406) may reference an external database carrying information related to the at least one plant corresponding to the identification data. The external database may, for example, include plant ant care instructions, plant care history, plant variety information, or other information particular to the at least one plant.

Figure 5:
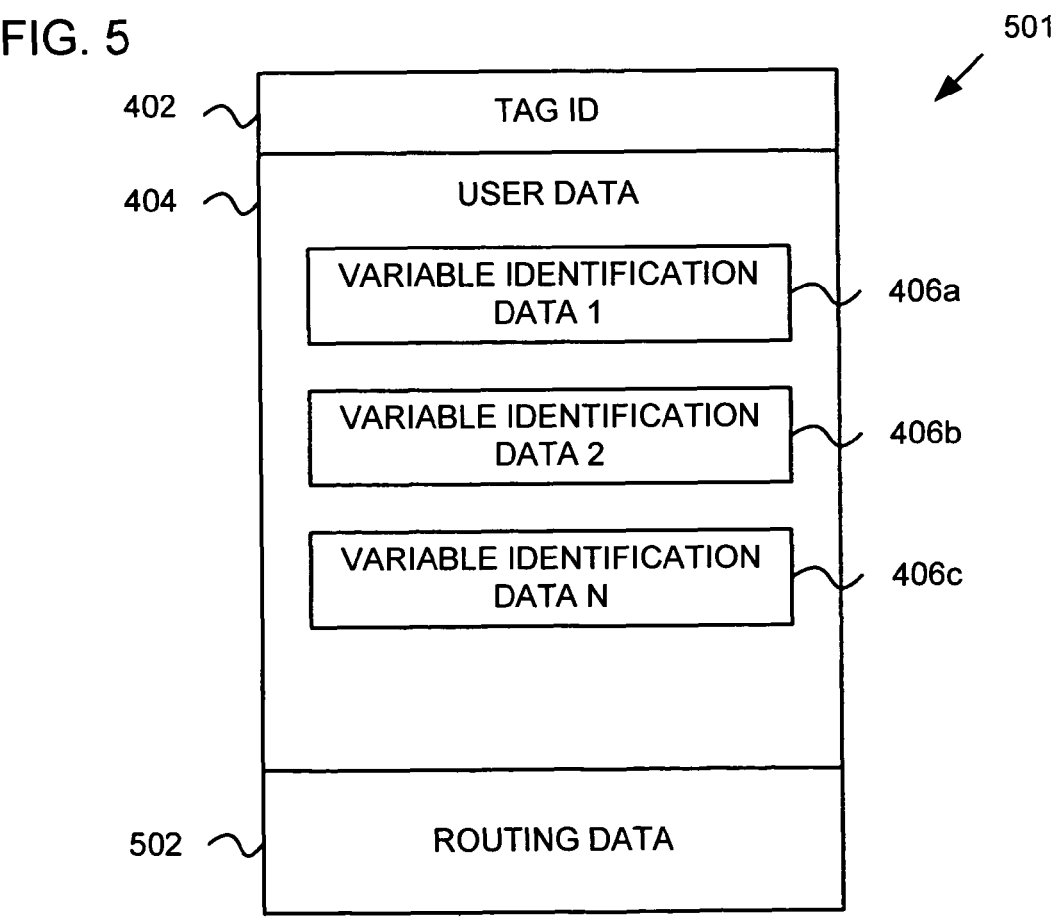
FIG. 5 is a diagram of memory contents of an electronic tag according to another embodiment.

FIG. 5 is a diagram 501 of memory contents of an electronic tag memory tag, according to another embodiment. In addition to the tag identification 402 shown in FIG. 4, the memory may include user data configured to carry (and after being written to, actually carrying) a plurality of identification data sets, shown as variable identification data 1 406a, variable identification data 2 406b, through variable identification data N, 406c.

According to an embodiment, the identity may include a plurality of identification data 406a, 406b, 406c such as may reference a particular at least one plant according to a series of identification data assigned by a plurality of trading partners. Alternatively, the plurality of identification data may reference a sequence of plant combinations as individuals of a plant population ore split, combined, processed, and sorted during processing to go to market; optionally with less than all (including zero) of the identification data corresponding to a particular at least one plant. However, according to randomness, lot size, plant recycle logic, sorting categories, number of sorting categories, suppliers, number of suppliers, number of steps in the supply chain, etc., even with zero of the identification data corresponding uniquely with the at least one plant, it may be possible to uniquely identify at least a portion of individuals of the population of at least one plants according to the uniqueness of processing received by the individual at least one plants. Uniqueness of processing may relate to a variability of individual treatments, for example.

According to embodiments, identification data may be decoded from a plurality of identification data instances 402, 406a, 406b, 406n corresponding to a plurality of steps encountered during processing etc. within one or more individual supply chain trading partners.

According to embodiments, an identity of individual supply chain trading partners may be secret, encrypted, unknown, and/or otherwise not readily discernable from identification data received during a given interrogation. For embodiments wherein, for a given at least one plant, externally-correlated plant information may be accessed at a plurality of possible coordinates, one or more computer programs may operate to attempt at least one query to at least one coordinate. According to an embodiment, the one or more computer programs may operate to attempt a plurality of queries to substantially each coordinate or a mirror thereof.

In one embodiment a set of most recently recorded information may be saved at a first data coordinate. The set of most recently recorded information may include a second data coordinate corresponding to a previous (e.g., immediately previous) set of recorded information. For example, the first data coordinate may correspond to a database sponsored by the electronic tag supplier, a standards organization, a user group, a management associate, the current trading partner, or other appropriate group. Generally, an appropriate group may be selected from groups receiving proceeds or other consideration from one or more transactions in the supply chain.

According to an embodiment, a plurality of trading partner-assigned identification codes received from substantially each of a corresponding plurality of at least one plants may be used to optimize the supply chain. For example, the health of plants that had received a treatment indicated by variable identification data N 406c may be different than the health of plants that had received a different treatment indicated by variable identification data N' (not shown). Statistical correlation of plant health to an effect or interaction effect indicated by variable identification data values may be used to select an alternative treatment, brand of fertilizer, supply chain partner, plant transporter, etc.

As indicated above, there may be uncertainty with respect to one or more data coordinates to where a query should be addressed. Optionally, the memory 401, 501 of an electronic memory tag may include routing data 502. Such routing data may provide one or more paths for transmitting a query specifying identification data. The routing data may or may not actually encode a physical or logical address corresponding to a database location and may alternatively include an address to a router configured to receive the identification data and forward a query with the identification data to another address.

FIG. 6 is a flow chart illustrating one or more processes 601 for correlating external data to at least one plant using an electronic tag, according to an embodiment. In FIG. 6 and in following figures that include various examples of operational flows, discussion and explanation may be provided with respect to the above-described examples of FIGS. 1-5, and/or with respect to other examples and contexts. However, it should be understood that the operational flows may be executed in a number of other environments and contexts, and/or in modified versions of FIGS. 1-5. Also, although the various operational flows are presented in the sequence(s) illustrated, it should be understood that the various operations may be performed in other orders than those which are illustrated, or may be performed concurrently.

In step 602 at least one plant including a corresponding electronic tag is provided. According to some embodiments, the at least one plant may be received from a supply partner or may be propagated.

Proceeding to step 604 an identification data corresponding to the at least one plant is determined from the electronic tag by interrogating the electronic tag to receive identification data from its memory. Such identification data may include a tag identification and/or may include one or more instances of variable identification data. Alternatively or additionally, step 604 may include writing identification data to a user accessible memory in the form of variable identification data.

In optional step 606, a database query may be performed to determine information about the at least one plant corresponding to the identification data. For example, if the at least one plant is received from a supplier carrying the electronic tag, a database at the supplier's website may be queried to determine a history of treatments received by the at least one plant. Alternatively, the database query performed in step 606 may include establishing a record corresponding to the at least one plant. This alternative may be especially appropriate for cases where the electronic tag was associated with the at least one plant during or after propagation, or where the at least one plant arrived from a supplier without an electronic tag, for example.

Proceeding to step 608, a treatment schedule may be determined, optionally from information received in a query performed in step 606. For example, if the query retrieved treatment information indicating the at least one plant had last been fertilized one week previous, and a nominal fertilizing interval is four weeks, then fertilizer is not scheduled to be applied for another three weeks and would not be applied. Alternatively, if a query indicated that fertilizer had last been applied four weeks previous, then the at least one plant would be queued to be fertilized in the near future.

Steps 610, 612 and 614 represent a loop that may be repeated to provide a record of treatments received by at least one plant. In step 610, an electronic tag is interrogated to receive an identification data corresponding to an associated at least one plant. Optionally, a database may be queried to determine whether application of a treatment to the at least one plant corresponding to the identification data is appropriate.

Proceeding to step 612, a treatment may be applied to or measurement made relative to the at least one plant. For example, a treatment may include one or more of, but not limited to seed collection, sprouting, taking a cutting, harvesting a rhizome, bulb, or corm, planting, transplanting, grafting, providing a soil temperature, providing a soil pH, providing an air temperature, providing a light intensity or duration, providing an air humidity, watering, fertilizer application, pesticide application, herbicide application, fungicide application, pruning, and/or measuring one or more environmental parameters.

Proceeding to step 614, the treatment application and/or parameters are written to a database at a record corresponding to the identification data corresponding to the at least one plant. The process of steps 610, 612, and 614 may then be repeated when a next treatment or measurement is made. Of course, the order of steps 610, 612, and 614 may be altered and/or performed substantially simultaneously. The result is an external record of treatments or measurements relevant to the at least one plant. One or more identification data sets in the electronic tag link the record of particular treatments and/or measurements to the corresponding at least one plant.

Optionally, in step 616 when a plant is sold or transferred to another trading partner (including, for example, the end purchaser), the electronic tag may be interrogated, and the record of data may be transferred to the receiving party or to a data storage resource accessible to the receiving party. Optionally, the data may remain substantially in place, but access privileges may be granted to the information corresponding to the at least one plant. Parameters corresponding to the transfer of the at least one plant may also be recorded in the database.

Referring back to FIG. 1, one or more databases may be linked to one or more plants via identification data saved in the memory of an electronic tag physically associated with the one or more plants. The database(s) may contain a variety of information related to the one or more plants. As indicated above, a database may include information related to a log of actual treatments received by the one or more plants. Additionally or alternatively, the information may include data corresponding to plant care instructions.

The data corresponding to plant care instructions may, for example, include a representation of plain language intended to inform a nursery, grower, transporter, retailer, gardener, and/or ultimate customer of the recommended conditions for growing the one or more plants. For example, plain language may include the instructions, "Full sun. Protect from freezing. Let roots dry between waterings. Fertilize moderately during spring."

The plant care instructions in the database(s) may include data corresponding to one or more region, geographical location, or climate zone, for example. The plant care instructions in the database(s) may also include data corresponding to one or more time intervals, such as an interval for application of treatments, an interval related to blooming, an interval related to propagation, an interval related to application of sun or light, etc. The plant care instructions may include data corresponding to watering instructions, sunlight instructions, planting instructions, fertilizing instructions, temperature instructions, type of soil instructions, soil pH instructions, pruning instructions, etc.

A database may include plant care information corresponding to one or more plants including a treatment record. For example, the treatment record may include logged instances of receiving various treatments and/or information related to the source of the plant material.

For example, the treatment record may include a series of data fields corresponding to a series of treatments such as " . . . T;water;1-1-2008;0630;015;T;water;1-1-2008;1400; 012; . . . ". In this example, each instance of a treatment includes several data fields beginning with an indicator of a treatment record (T), indication of what treatment was applied (water), the date of application (Jan. 1, 2008), the time of the application (6:30 am and 2:00 pm, respectively), and the duration of the treatment (15 minutes and 12 minutes, respectively), with each data field being delimited by semicolons. Of course, this example may be simplified for ease of use, other field delimiters may be selected, treatment types may be coded, the fields may be entered in a different order, and/or other differences may occur.

Such a record of treatments may be written, for example, substantially in real time with application of the corresponding treatments. In such case, it may be advantageous to have the system (e.g. a computer program or the interrogator 106 of FIG. 1) automatically generate a time code and/or duration code to avoid tampering. When read, the record of treatments may be used to assess the quality and consistency of care received by one or more plants, such as for quality assurance purposes, for assigning a value to the one or more plants, for diagnosing disease or determining preventive care, for determining safety parameters (such as if dangerous pesticides were used), for determining a holding period (for a pesticide to decompose), for optimizing future plant care, etc. In addition, the treatment record may include additional data that may be grouped as part of the treatment record.

For example, the treatment record may include data corresponding to one or more of seed variety, seed batch, seed source, sprouting date, cutting variety, cutting batch, cutting date, cutting source, rhizome variety, rhizome batch, rhizome harvest date, rhizome source, bulb variety, bulb batch, bulb source, bulb harvest date, corm variety, corm batch, corm source, corm harvest date, planting date, graft date, soil temperature, soil pH, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and/or packing date.

FIG. 7 is a flow chart illustrating a process 701 for receiving at least one plant with an electronic tag, interrogating the electronic tag to receive identification data, and querying a database specifying the identification data code to received data corresponding to the at least one plant, according to an embodiment. In step 702, at least one plant is received along with at least one electronic tag associated with the plant. According to embodiments, the at least one electronic tag may be physically associated with the at least one plant.

Proceeding to step 704, the electronic tag is interrogated. According to embodiments, the electronic tag may include a RF tag such as a passive radio frequency tag, an active radio frequency tag, a backscatter radio frequency tag, a half-duplex radio frequency tag, or a full-duplex radio frequency tag; a touch memory device; a proximity card; a photonic tag; a smart card; etc. Accordingly, interrogating the electronic tag may include performing radio frequency interrogation; performing touch memory interrogation, performing proximity card interrogation, performing photonic tag interrogation, performing smart card interrogation, etc. The electronic tag responds to the interrogation by providing at least one set of identification data.

In step 705, a location for a database is determined. A variety of database location determination approaches may be used. An approach may include performing an algorithm on the received identification data to determine metadata corresponding to a data storage location and to determine an address on a network corresponding to an access node corresponding to the database.

The identification data may be received and an algorithm performed on it to determine a database location. The algorithm may include logical, mathematical, sequential, and/or look-up table (LUT) functions. For example, as a default condition, database records corresponding to instances of the at least one plant may be saved in a first database at a known server location. For instances of the at least one plant received from one or more suppliers, database records may be received from the suppliers and loaded into the first database. Additionally or alternatively, a range of identification data values may be associated with a given plant supplier so the algorithm may include accessing a database at a supplier corresponding to a range including the received identification data.

Alternatively, information about the tag supplier may be received from the electronic tag during interrogation such as, either implicitly (e.g. by determining a tag supplier-specific protocol or protocol characteristic) or explicitly. In such cases, the tag supplier may provide a default database location that may be accessed. For example, a record corresponding to the identification data may include a URL, IP address, or other data coordinates where the related information is stored. Thus, writing information to at least one plant to a database may include also writing data to the tag supplier or industry association database or registry providing access information related to the database where the information is stored.

Alternatively, routing information related to the location of one or more corresponding databases may be received from the electronic tag memory during interrogation. Thus, step 704 may include interrogating the electronic tag to receive one or more instances of identification data and one or more pieces of routing information or identifiers. Accordingly, step 705 may alternatively include parsing the received data to separate identification data from routing data or identifier, and inputting the routing data or identifier into an algorithm such as a LUT.

The information related to the at least one plant may be possibly disposed in one of a plurality of databases. Alternatively, the information may be disposed in more than one of a plurality of databases. The algorithm may include sequentially accessing at least one of the plurality of relational databases, and if the query returns a null, non-contextual, or non-decodable response, incrementing to the next of the plurality of relational databases.

Alternatively, there may be no identification data range, routing data, tag supplier information or other approach to narrowing down the locations of potential databases containing information corresponding to the at least one plant. The algorithm may include providing a list of locations of possible corresponding databases. Optionally, the list may be sorted in order of probability, such as by first providing a location where a recently performed query was successful.

The database may include an in-store or in-premises database. Any in-premises database (which may be physically stored external to the user's facility, such as at a leased or sponsored external server) may be used as a default or specified query address.

Alternatively, a specified query address may be used. For example a plant information correlation processor may be provided as a computer program running on a known server. The plant information correlation processor may, for example, be sponsored by an industry group, an electronic tag supplier, etc. The plant information correlation processor may include a networked node providing access to a plurality of manufacturer database resources and a message router configured to conditionally route the query across the networked node to the plurality of manufacturer database resources. The message router may, for example, include one or more of the algorithm approaches above. Additionally, the message router may include a LUT or registry including substantially all identification data sets in use by the plant supply chain and operate by simply looking up the proper database location. The registry may be populated by supply chain members as information related to a given identification data and a given at least one plant is written.

Proceeding to step 706, the one or more databases determined in step 705 is queried for data corresponding to the identification data received in step 704. Accordingly, since the identification data also corresponds to the at least one plant, it may be appreciated that the queried data corresponds to the at least one plant. According to an embodiment, the data may include data corresponding to instructions for care of the at least one plant. The data corresponding to plant care instructions may include data corresponding to watering instructions, sunlight instructions, planting instructions, fertilizing instructions, temperature instructions, pruning instructions, etc.

According to an embodiment, data corresponding to the at least one plant may include data corresponding to a record of treatments received by the at least one plant. For example, data corresponding to a record of treatments received by the at least one plant may include seed variety, seed batch, seed source, sprouting date, cutting variety, cutting batch, cutting date, cutting source, rhizome variety, rhizome batch, rhizome harvest date, rhizome source, bulb variety, bulb batch, bulb source, bulb harvest date, corm variety, corm batch, corm source, corm harvest date, planting date, graft date, soil pH, soil temperature, air temperature, light intensity, light duration, light schedule, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, packing date, etc.

According to an embodiment, the data corresponding to the at least one plant may include structured data. Such structure data may include at least one data identifier corresponding to a record of at least one previous treatment. The structured data may include at least one application data identifier and/or data tag corresponding to instructions for care of the at least one plant. The at least one application data identifier and/or data tag may correspond to an industry-assigned code corresponding to at least one data field carrying the data corresponding to the at least one plant. The structured data may include a data envelope structure including data corresponding to the at least one plant including the care of the at least one plant. Care of at least one plant may include a history of treatments received and/or instructions for plant care.

Proceeding to optional step 708, the data may be processed. For example the data may be parsed, a need for treatment may be assessed, the quality of care of the at least one plant may be assessed, a treatment device may be enabled, a treatment may be stopped, the data may be visually displayed, the data may be printed, the data may be presented via an audio output, etc.

FIG. 8 is a flow chart illustrating a process 801 for associating an electronic tag with at least one plant and writing to a database information pertaining to the at least one plant, according to an embodiment. In step 802, an electronic tag is associated with at least one plant. According to an embodiment, the electronic tag may be physically associated with the at least one plant in a permanent or semi-permanent way such that the tag remains associated with the plant during a sequence of movements of the plant or plants. For example, as shown in FIG. 3, the electronic tag 104 may include an attachment feature 316 that may be looped around a stem of a plant and securely fastened into the body of the electronic tag, such as in the manner of a zip tie.

According to embodiments, physically associating the electronic tag with at least one plant may include attaching the electronic tag to the exterior or the at least one plant, at least partially embedding the electronic tag within the at least one plant, attaching the electronic tag to a container of the at least one plant, disposing the electronic tag on or within the soil physically associated with the at least one plant, etc.

Proceeding to step 804, an identification data from the electronic tag is determined. For example, the identification data may correspond to the tag identification or tag ID. The tag ID is a unique identification that may, for example, include a plurality of ASCII characters. In some embodiments, the tag ID may be hard coded or "locked" into the tag memory at the time of manufacture, and thus may be determined by interrogating the electronic tag 104. In other embodiments, the electronic tag 104 may be blank when delivered, and the tag ID may be determined by incrementing a counter, looking up an unassigned ID in a database, generating a random or pseudo-random number, or otherwise establishing a string of bits or characters that is then written to the electronic tag to uniquely or quasi-uniquely identify the electronic tag. By extension, the tag ID may then be used to uniquely or quasi-uniquely identify the at least one plant with which it is associated. Other processes described above may similarly be employed to determine an identification data.

Of course, steps 802 and 804 may be reversed without departing from the scope of the process 801. In some embodiments, such as when the electronic tag is embodied as a touch memory device for example, the assignment and/or determination of a tag ID may be omitted. In such cases, addressing or interrogating the electronic tag may typically be by physical contact, making the use of a tag ID unnecessary for establishing an unambiguous communication relationship with an interrogator 106. However, in such cases, identification data is selected and written to user accessible memory in the electronic tag.

Proceeding to step 806, data corresponding to the at least one plant 102 is determined. For example, plant care instructions corresponding to the at least one plant may be entered via a keyboard, looked up in a database, etc. An example of such data is described above. Or for example, a treatment such as watering, fertilizing, etc. may be applied to the at least one plant, and treatment record data may be generated as a function of the type of treatment, duration, amount, etc. Such action-responsive data determination may, according to some embodiments, be considered a log entry pertaining to the treatments applied to or received by the at least one plant 102.

Proceeding to step 808, the data corresponding to at least one plant 102 is written to an external database, using the identification data as a record identifier for correlating the at least one plant to one or more particular records in the database.

Optionally, the process 801 may loop back to step 806, and additional, supplemental, or replacement data may be determined for writing to external database.

Referring to step 804, identification data may be written to the electronic tag. Writing an identification data to an electronic tag may involve reading the identification data previously written to the electronic tag and then writing new identification data to the electronic tag.

For example, the previous identification data may be read to determine a next address, sector, block, etc. available for writing new data, and the new identification data may be written to the determined address, sector, block, etc. In such cases, the new identification data may be flagged to supersede the previous identification data or may substantially function as incremental data, with the new identification data working in combination with one or more sets of previous identification data to relate the electronic tag and the at least one plant to a complete record of the plant data that may span several records in a database or several databases.

According to another example, the previous identification data may be read to determine its content. Data in an external database corresponding to the previous identification data may be discarded or moved to a new location in the database or to another database corresponding to the new identification data. New information about the at least one plant may be combined with the previous information in a new record or database.

The foregoing specific exemplary processes and/or devices and/or technologies are representative of more general processes and/or devices and/or technologies taught elsewhere herein, such as in the claims filed herewith and/or elsewhere in the present application.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein may be implemented in an analog or digital fashion or some combination thereof.

The reader will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described components (e.g., steps), devices, and objects and the discussion accompanying them are used as examples for the sake of conceptual clarity and that various configuration modifications are within the skill of those in the art. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader may translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components may be referred to herein as "configured to." Those skilled in the art will recognize that "configured to" can generally encompass active-state components and/or inactive-state components and/or standby-state components, etc. unless context requires otherwise.

While particular aspects of the present subject matter described herein have been shown and described, it will be apparent that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. Examples of such alternate orderings may include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for providing plant care information, comprising:
    associating an electronic tag carrying identification data with at least one plant, the identification data including a uniform resource locator or internet protocol address corresponding to a location of the database; and
    storing in a database the identification data and related data corresponding to care of the at least one plant.

2. The method of claim 1, wherein the identification data includes a unique electronic tag identifier.

3. The method of claim 1, wherein the electronic tag is selected from the group consisting of read-only, field-programmable, write-once-read-many-times, and read/write.

4. The method of claim 1, further comprising writing the identification data to an electronic memory circuit in the electronic tag via an interrogation interface.

5. The method of claim 1, further comprising reading the identification data from an electronic memory circuit in the electronic tag via an interrogation interface.

6. The method of claim 5, wherein reading the identification data from the electronic memory circuit in the electronic tag includes at least one selected from the group consisting of: performing radio frequency interrogation; performing touch memory interrogation, performing proximity card interrogation, performing photonic tag interrogation, and performing smart card interrogation.

7. The method of claim 1, wherein the electronic tag includes at least one selected from the group consisting of a radio frequency tag, a passive radio frequency tag, an active radio frequency tag, a backscatter radio frequency tag, a half-duplex radio frequency tag, a full-duplex radio frequency tag, a touch memory device, a proximity card, a photonic tag, and a smart card.

8. The method of claim 1, wherein the related data corresponding to care of the at least one plant includes data corresponding to a record of treatments received by the at least one plant.

9. The method of claim 8, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

10. The method of claim 1, wherein the related data corresponding to care of the at least one plant includes data corresponding to plant care instructions for the at least one plant.

11. The method of claim 10, wherein the data corresponding to plant care instructions includes data corresponding to at least one selected from the group consisting of watering instructions, sunlight instructions, planting instructions, fertilizing instructions, temperature instructions, type of soil instructions, soil pH instructions, and pruning instructions.

12. The method of claim 10, wherein the data corresponding to plant care instructions includes data corresponding to one or more region or geographical location.

13. The method of claim 10, wherein the data corresponding to plant care instructions includes data corresponding to one or more time intervals.

14. The method of claim 1, further comprising:
receiving a query specifying the identification data; and
responsive to the query, transmitting the related data corresponding to care of the at least one plant.

15. The method of claim 14, wherein the query is received via at least one selected from the group consisting of: the Internet, an intranet, a local area network, and a virtual private network.

16. The method of claim 1, further comprising storing additional related data corresponding to the care of the at least one plant when the additional data is subsequently generated.

17. The method of claim 16, wherein the additional data corresponds to a treatment provided to or a growth condition measured relative to the at least one plant and wherein the additional related data is stored at about the same time the treatment or measurement occurs.

18. The method of claim 1, wherein the identification data includes a database record identifier disposed in a user accessible section of a memory circuit in the electronic tag.

19. The method of claim 1, further comprising transmitting at least a portion of the database to a reseller when the at least one plant is transferred to the reseller.

20. A method for receiving plant care information, comprising:
interrogating an electronic tag associated with at least one plant to receive identification data;
performing a query of a relational database specifying a query parameter corresponding to the identification data;
parsing the identification data to extract data corresponding to a data storage location;
accessing the relational database corresponding to the data storage location; and
receiving information from the relational database corresponding to care of the at least one plant.

21. The method of claim 20, further comprising:
determining a relational database in which to perform the query.

22. The method of claim 20, further comprising:
performing an algorithm on the parsed data corresponding to the data storage location to determine an address on a network corresponding to an access node corresponding to the database.

23. The method of claim 20, wherein the relational database includes a plurality of relational databases.

24. The method of claim 23, further comprising:
sequentially accessing at least one of the plurality of relational databases; and
if the query returns a null, improperly formatted, improper data, or non-decodable response, incrementing to the next of the plurality of relational databases.

25. The method of claim 20, further comprising:
inputting the identification data to an algorithm or look-up table (LUT).

26. The method of claim 25, further comprising:
receiving a query address from the algorithm or LUT; and
performing the query at the query address.

27. The method of claim 20, wherein the database includes an in-premises or leased database.

28. The method of claim 20, further comprising:
transmitting the query to a plant information processor including:
a networked node providing access to a plurality of manufacturer database resources; and
a message router configured to conditionally route the query across the networked node to the plurality of manufacturer database resources.

29. The method of claim 20, wherein the electronic tag is selected from the group consisting of read-only, field-programmable, write-once-read-many-times, and read/write.

30. The method of claim 20, wherein interrogating the electronic tag includes at least one selected from the group consisting of: performing radio frequency interrogation; performing touch memory interrogation, performing proximity card interrogation, performing photonic tag interrogation, and performing smart card interrogation.

31. The method of claim 20, wherein interrogating an electronic tag includes interrogating at least one selected from the group consisting of a radio frequency tag, a passive radio frequency tag, an active radio frequency tag, a back-scatter radio frequency tag, a half-duplex radio frequency tag, a full-duplex radio frequency tag, a touch memory device, a proximity card, a photonic tag, and a smart card.

32. The method of claim 20, wherein the information includes data corresponding to a record of treatments received by the at least one plant.

33. The method of claim 32, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

34. The method of claim 20, wherein the information corresponding to care of the at least one plant includes data corresponding to plant care instructions for the at least one plant.

35. The method of claim 34, wherein the data corresponding to plant care instructions includes data corresponding to at least one selected from the group consisting of watering instructions, sunlight instructions, planting instructions, fertilizing instructions, temperature instructions, type of soil instructions, soil pH instructions, pruning instructions, regional information, climate information, geographical location information, and one or more time intervals.

36. The method of claim 20, further comprising:
receiving a query specifying the parameter corresponding to the identifier; and
responsive to the query, transmitting the information corresponding to care of the at least one plant.

37. The method of claim 36, wherein the query is received via at least one selected from the group consisting of: the Internet, an intranet, a local area network, and a virtual private network.

38. The method of claim 20, wherein the information includes data corresponding to a treatment provided to the at least one plant;
and wherein the data was stored at about the same time the treatment was provided.

39. The method of claim 20, wherein the information includes data corresponding to a growth condition measured relative to the at least one plant;
and wherein the data was stored at about the same time the measurement occurred.

40. The method of claim 20, wherein the identification data includes a database record identifier disposed in a user accessible section of a memory circuit in the electronic tag.

41. The method of claim 20, further comprising:
receiving from the electronic tag a uniform resource locator or internet protocol address corresponding to a location to which the query is transmitted.

42. A system for receiving plant care information, comprising:
an electronic tag interrogator configured to read identification data from an electronic tag associated with at least one plant; and
a computer configured to receive the identification data from the electronic tag interrogator, perform a database query specifying the identification data, receive plant care information related to the identification data, and perform an operation to select a database for query.

43. The system of claim 42, further comprising:
a first plurality of electronic tags corresponding to a second plurality of plants.

44. The system of claim 43, wherein the first plurality substantially equals the second plurality.

45. The system of claim 43, wherein the first plurality of electronic tags are configured to collectively cross correlate to the second plurality of plants; and further comprising:
a processor configured to calculate or determine inventory shrinkage in the second plurality of plants according to a relationship between nominally present identification data and actually present identification data.

46. The system of claim 45, wherein the processor is configured to process the queries made to the database to determine at least one selected from the group consisting of a location, time, time range, transportation status, and ownership corresponding to an instance of inventory shrinkage.

47. The system of claim 45, wherein the processor includes a software algorithm.

48. The system of claim 42, wherein the computer is further configured to determine a database in which to perform the query.

49. The system of claim 48, wherein the computer is configured to determine a database by parsing the identification data to extract data corresponding to a data access location.

50. The system of claim 49, wherein extracting data includes performing an algorithm on the parsed data corresponding to determine the data access location corresponding to the database.

51. The system of claim 42 wherein the database includes a plurality of databases.

52. The system of claim 51, wherein performing a database query includes sequentially accessing at least one of the plurality of databases; and
if the query returns a null, improperly formatted data, improper data, or non-decodable response, incrementing to the next of the plurality of databases.

53. The system of claim 42, further wherein the computer is further configured to input the identification data to an algorithm or look-up table (LUT).

54. The system of claim 53, wherein the computer is further configured to:
receive a query address from the algorithm or LUT; and
perform the query at the query address.

55. The system of claim 42, wherein the database includes an in-premises database or leased database.

56. The system of claim 42, further comprising:
a plant information processor configured to receive the query, the plant information processor including:
a networked node providing access to a plurality of manufacturer database resources; and
a message router configured to conditionally route the query across the networked node to the plurality of manufacturer database resources.

57. The system of claim 42, wherein the electronic tag is selected from the group consisting of read-only, field-programmable, write-once-read-many-times, and read/write.

58. The system of claim 42, wherein the electronic tag interrogator includes at least one selected from the group consisting of: a radio frequency tag interrogator; a touch memory interrogator, a proximity card interrogator, a photonic tag interrogator, and a smart card interrogator.

59. The system of claim 42, wherein the electronic tag interrogator is configured to read an electronic tag including at least one selected from the group consisting of a radio frequency tag, a passive radio frequency tag, an active radio frequency tag, a backscatter radio frequency tag, a half-duplex radio frequency tag, a full-duplex radio frequency tag, a touch memory device, a proximity card, a photonic tag, and a smart card.

60. The system of claim 42, wherein the plant care information includes data corresponding to a record of treatments received by the at least one plant.

61. The system of claim 60, wherein the data corresponding to the record of treatments includes data corresponding to at least one selected from the group consisting of seed variety, seed batch, seed source, sprouting date, cutting variety, cutting batch, cutting date, cutting source, rizome variety, rizome batch, rizome harvest date, rizome source, bulb variety, bulb batch, bulb source, bulb harvest date, corm variety, corm batch, corm source, corm harvest date, planting date, graft date, soil temperature, air temperature, light intensity, light duration, light schedule, soil pH, air humidity, soil humidity, watering volume, watering duration, watering schedule, fertilizer type, fertilizer amount, fertilizer application, fertilizer schedule, pesticide type, pesticide amount, pesticide application, pesticide schedule, herbicide type, herbicide amount, herbicide application, herbicide schedule; fungicide type, fungicide amount, fungicide application, fungicide schedule, forcing conditions, pruning application, pruning schedule, pruning style, caretaker identity, plant source identity, shipper identity, ship date, packer identity, and packing date.

62. The system of claim 42, wherein the plant care information includes data corresponding to plant care instructions for the at least one plant.

63. The system of claim 62, wherein the data corresponding to plant care instructions includes data corresponding to at least one selected from the group consisting of watering instructions, sunlight instructions, planting instructions, fertilizing instructions, temperature instructions, type of soil instructions, soil pH instructions, pruning instructions, regional information, climate information, geographical location information, and one or more time intervals.

64. The system of claim 24, further comprising a database query processor configured to:
receive a query specifying a parameter corresponding to the identification data; and
responsive to the query, transmitting the plant care information.

65. The system of claim 64, wherein the query is received via at least one selected from the group consisting of: the Internet; a local area network; and a virtual private network.

66. The system of claim 42, wherein the information includes data corresponding to a treatment provided to the at least one plant;
and wherein the data was stored at about the same time the treatment was provided.

67. The system of claim 42, wherein the information includes data corresponding to a growth condition measured relative to the at least one plant;
and wherein the data was stored in the database at about the same time the measurement occurred.

68. The system of claim 42, wherein the identification data includes a database record identifier disposed in a user accessible section of a memory circuit in the electronic tag.

69. The system of claim 42, wherein the electronic tag interrogator is further configured to receive from the electronic tag a uniform resource locator or internet protocol address corresponding to a location to which the query is transmitted.

70. The system of claim 42, wherein the computer further includes a data storage apparatus configured to store the database.

71. The system of claim 42, wherein the computer includes a network interface and the database is located at a networked location separate from the computer.

72. The system of claim 42, further comprising a bar code reader operatively coupled to the computer and configured to read a bar code symbol associated with the plant to receive a manufacturer code;
and wherein the computer is configured to select for the query a database or portion of a database corresponding to the manufacturer code.

73. The system of claim 42, wherein the electronic tag interrogator is further configured to read a manufacturer code from the electronic tag;
and wherein the computer is configured to select for the query a database or portion of a database corresponding to the manufacturer code.

74. A method for receiving plant care information, comprising:
interrogating a machine-readable tag during a sale transaction, the machine-readable tag operatively coupled to at least one plant to receive a tag identification;
transmitting a query to a relational database specifying the tag identification;
receiving from the relational database information corresponding to the at least one plant; and
outputting the information.

75. The method of claim 74, wherein the information is output on a sale transaction receipt.

76. The method of claim 74, wherein the information corresponding to the at least one plant includes plant care information.

77. The method of claim 74, wherein the information corresponding to the at least one plant includes plant care instructions for the at least one plant.

78. The method of claim 74, wherein the information corresponding to the at least one plant includes a record of treatments or growth conditions corresponding to the at least one plant.

79. A method for providing plant care information, comprising:
associating in a database, data corresponding to the care of at least one plant with data identifying the at least one plant, wherein at least one of the at least one plant has associated therewith an electronic identification tag carrying identification data; and
transmitting to a second database at least a portion of the data identifying the at least one plant and data corresponding to the location of the database.

80. The method of claim 79, wherein the data corresponding to the care of the at least one plant includes at least one selected from the group consisting of plant care instructions and a record of at least one plant care treatment.

81. The method of claim 79, further comprising:
providing to the electronic identification tag information related to a location corresponding to the database.

82. The method of claim 79, further comprising:
associating in a registry the data identifying the at least one plant with data corresponding to accessing the database.

83. The method of claim 79, wherein the data corresponding to the location of the database includes at least one selected from the group consisting of an IP address and a URL from which the data corresponding to the care of the at least one plant may be retrieved.

84. The method of claim 79, wherein the data corresponding to the location of the database includes a location to where the data identifying the at least one plant may be transmitted for the purpose of receiving the data corresponding to the care of the at least one plant.

85. A method for providing plant care information, comprising:
associating an electronic tag carrying identification data with at least one plant;
storing in a database the identification data and related data corresponding to care of the at least one plant; and
transmitting at least a portion of the database to a reseller when the at least one plant is transferred to the reseller.

86. A method for receiving plant care information, comprising:
interrogating an electronic tag associated with at least one plant to receive identification data;
performing a query of a plurality of relational databases specifying a query parameter corresponding to the identification data; and receiving information from at least one of the plurality of relational databases corresponding to care of the at least one plant.

87. The method of claim 86, further comprising:
sequentially accessing at least one of the plurality of relational databases; and
if the query returns a null, improperly formatted, improper data, or non-decodable response, incrementing to the next of the plurality of relational databases.

88. A method for receiving plant care information, comprising:
interrogating an electronic tag associated with at least one plant to receive identification data;
inputting the identification data to an algorithm or look-up table (LUT)
performing a query of a relational database specifying a query parameter corresponding to the identification data; and
receiving information from the relational database corresponding to care of the at least one plant.

89. The method of claim 88, further comprising:
receiving a query address from the algorithm or LUT; and
performing the query at the query address.

90. A method for receiving plant care information, comprising:
interrogating an electronic tag associated with at least one plant to receive identification data;
performing a query of a relational database specifying a query parameter corresponding to the identification data;
receiving information from the relational database corresponding to care of the at least one plant; and
transmitting the query to a plant information processor including:
a networked node providing access to a plurality of manufacturer database resources; and
a message router configured to conditionally route the query across the networked node to the plurality of manufacturer database resources.

91. A method for receiving plant care information, comprising:
interrogating an electronic tag associated with at least one plant to receive identification data;
performing a query of a relational database specifying a query parameter corresponding to the identification data;
receiving from the electronic tag a uniform resource locator or internet protocol address corresponding to a location to which the query is transmitted; and
receiving information from the relational database corresponding to care of the at least one plant.

92. A system for receiving plant care information, comprising:
an electronic tag interrogator configured to read identification data from an electronic tag associated with at least one plant; and
a computer configured to receive the identification data from the electronic tag interrogator, perform a database query specifying the identification data, receive plant care information related to the identification data, and determine a database in which to perform the query by parsing the identification data to extract data corresponding to a data access location.

93. The system of claim 92, wherein extracting data includes performing an algorithm on the parsed data corresponding to determine the data access location corresponding to the database.

94. A system for receiving plant care information, comprising:
an electronic tag interrogator configured to read identification data from an electronic tag associated with at least one plant; and
a computer configured to receive the identification data from the electronic tag interrogator, perform a database query of a plurality of data bases specifying the identification data, and receive plant care information related to the identification data.

95. The system of claim 94, wherein performing a database query includes sequentially accessing at least one of the plurality of databases; and
if the query returns a null, improperly formatted data, improper data, or non-decodable response, incrementing to the next of the plurality of databases.

96. A system for receiving plant care information, comprising:
an electronic tag interrogator configured to read identification data from an electronic tag associated with at least one plant; and
a computer configured to receive the identification data from the electronic tag interrogator, input the identification data to an algorithm or look-up table (LUT), perform a database query specifying the identification data, and receive plant care information related to the identification data.

97. The system of claim 96, wherein the computer is further configured to:
receive a query address from the algorithm or LUT; and
perform the query at the query address.

98. A system for receiving plant care information, comprising:
an electronic tag interrogator configured to read identification data from an electronic tag associated with at least one plant;
a computer configured to receive the identification data from the electronic tag interrogator, perform a database query specifying the identification data, and receive plant care information related to the identification data; and
a plant information processor configured to receive the query, the plant information processor including:
a networked node providing access to a plurality of manufacturer database resources; and
a message router configured to conditionally route the query across the networked node to the plurality of manufacturer database resources.

99. A system for receiving plant care information, comprising:
an electronic tag interrogator configured to read identification data from an electronic tag associated with at least one plant and receive from the electronic tag a uniform resource locator or internet protocol address corresponding to a location to which a database query is to be transmitted; and
a computer configured to receive the identification data from the electronic tag interrogator, perform the database query specifying the identification data, and receive plant care information related to the identification data.

100. A system for receiving plant care information, comprising:
an electronic tag interrogator configured to read identification data from an electronic tag associated with at least one plant; and
a computer configured to receive the identification data from the electronic tag interrogator, perform a database query specifying the identification data, and receive plant care information related to the identification data;

wherein the computer includes a network interface and the database is located at a networked location separate from the computer.

101. A system for receiving plant care information, comprising:

an electronic tag interrogator configured to read identification data from an electronic tag associated with at least one plant;

a computer configured to receive the identification data from the electronic tag interrogator, perform a database query specifying the identification data, and receive plant care information related to the identification data; and a bar code reader operatively coupled to the computer and configured to read a bar code symbol associated with the plant to receive a manufacturer code; and wherein the computer is configured to select for the query a database or portion of a database corresponding to the manufacturer code.

102. A system for receiving plant care information, comprising:

an electronic tag interrogator configured to read identification data from an electronic tag associated with at least one plant and read a manufacturer code from the electronic tag; and a computer configured to receive the identification data from the electronic tag interrogator, perform a database query specifying the identification data, and receive plant care information related to the identification data; and wherein the computer is further configured to select for the database query a database or portion of a database corresponding to the manufacturer code.

103. A method for receiving plant care information, comprising:

interrogating a machine-readable tag operatively coupled to at least one plant to receive a tag identification;

transmitting a query to a relational database specifying the tag identification;

receiving from the relational database information corresponding to the at least one plant; and outputting the information on a sale transaction receipt.

104. A method for providing plant care information, comprising:

associating in a database, data corresponding to the care of at least one plant with data identifying the at least one plant, wherein at least one of the at least one plant has associated therewith an electronic identification tag carrying identification data; and associating in a registry the data identifying the at least one plant with data corresponding to accessing the database.

* * * * *